3,151,059
CATALYST DEMETALLIZATION
Robert L. Foster, Homewood, Ill., Arvin D. Anderson, Anaheim, Calif., and James P. Gallagher, Park Forest, Ill., assignors, by mesne assignments, to Sinclair Research, Inc., New York, N.Y., a corporation of Delaware
No Drawing. Filed June 8, 1961, Ser. No. 115,617
18 Claims. (Cl. 208—120)

This invention concerns the removal of vanadium and other poisoning metals from a synthetic gel hydrocarbon conversion catalyst which has been contaminated with vanadium and perhaps other metals by use in the high temperature catalytic conversion of feedstocks containing vanadium. The invention comprises sulfiding the catalyst and mechanically removing solid metal poison from the surface of the catalyst. Although a number of procedures have recently been developed for the removal of poisoning metals from a solid oxide hydrocarbon conversion catalyst, such procedures generally involve removal of metal poisons from the solid oxide hydrocarbon conversion catalyst in liquid or vapor form by dissolving or volatilizing them from the catalyst, usually after subjecting the catalyst, outside the hydrocarbon conversion system, to elevated temperature conditions which put the metal contaminants into the chloride, sulfate or other volatile, water-dispersible or more available form.

In this invention, however, sulfiding and certain other preparatory steps may be employed with a mechanical removal step to avoid the reagent costs, equipment corrosion and heat losses associated with poison removal by conversion of the poisoning metal to liquid or vapor form. It has been found that a catalyst poisoned with vanadium may be freed of this poisoning metal to a considerable extent by treating the catalyst at an elevated temperature with a sulfiding gas to convert surface poisoning metals to a solid sulfur compound at the exterior surface of the catalyst particle and subjecting the catalyst to mechanical procedures which destroy the relatively weak forces bonding the solid compound to the surface of the catalyst. Preferably sulfiding is preceded by treatment of a regenerated catalyst at an elevated temperature with molecular oxygen-containing gas to stabilize a considerable amount of vanadium (generally as an oxide) in its highest valence state at the surface of the catalyst.

The composition of the metal-sulfur compound which is formed and removed in the process of this invention is not certain. It is apparently a sulfide or oxysulfide of vanadium. However the compound is characterized by a definite X-ray diffraction pattern and by a capacity for crystal growth, under sulfiding conditions, to a size of about 0.5 to 1.0 micron. The following X-ray diffraction pattern in characteristic of the compound:

| d/n | Int. | d/n | Int. |
|---|---|---|---|
| 5.55 | 3 | 2.12 | 2 |
| 5.05 | 5 | 2.04 | 3 |
| 3.17 | 4 | 2.00 | 6 |
| 2.86 | 4 | 1.96 | 10 |
| 2.61 | 1 | 1.90 | 3 |
| 2.56 | 10 | 1.67 | 6 |
| 2.53 | 7 | 1.64 | 3 |
| 2.45 | 3 | 1.53 | 4 |

This compound is of further value in demetallization due to the fact that certain amounts of nickel and/or iron can be included in the crystal structure without changing its physical characteristics. Nickel and iron, being other materials which poison the activity of cracking catalysts, this phenomenon is useful in removing these materials as solids, as well as vanadium. The vanadium-sulfur crystal can accommodate nickel atoms up to about 45% of the total number of nickel and vanadium atoms in the crystal. Put another way, there may average as much as 0.8 atom of nickel in the crystal per atom of vanadium. Similarly, the crystal may accommodate up to about 1.5 atoms or more of iron per atom of vanadium.

In one aspect, the process of this invention comprises treating a regenerated catalyst poisoned with vanadium at an elevated temperature with molecular oxygen-containing gas, sulfiding the catalyst to form the vanadium-sulfur compound and mechanically removing the solid vanadium compound from the catalyst by pruning the crystals from the catalyst particles and disentraining the loose crystals from the mass of catalyst. Such pruning may be accomplished by shaking or scraping off the solid vanadium compound; severe agitation of the sulfided catalyst which causes a slight grinding or abrasive action by the catalyst particles against each other also removes solid vanadium compound from the catalyst. Although the treatment of the catalyst with sulfiding gas in a fluidized bed is in itself productive of some particle-to-particle frictional contact which brings about some removal of the solid vanadium compound from the catalyst, the particles in a fluidized bed are generally in a weightless condition, and the friction is not great. It is preferred that the agitation be so severe as to remove 10 to 100% of the solid vanadium compound formed on the catalyst surface, which may be about 5 to 60%, preferably 10 to 50% of the total vanadium in the catalyst, so that sulfidation usually needs to be supplemented with a separate pruning step. The pruning step is conducted in an inert environment, that is, in the absence of any material or conditions which would destroy the solid form of the vanadium compound crystals.

Although elutriation of the lighter solid vanadium compound from the catalyst mass may take place by contact with a liquid or vaporous inert fluid after completion of the agitation, it is preferable to remove the solid compound from the catalyst mass as it is pruned from the catalyst particle. Thus, a liquid or gas may be passed through a bed of the catalyst particles while being subjected to the scraping or severe agitation. The sulfiding gas itself may even perform part of the compound removal. By "inert fluid" therefore is meant a gas or liquid which does not destroy the solid form of the vanadium compound.

Commercially the invention may be used as part of a catalytic cracking operation wherein a petroleum hydrocarbon feedstock containing poisoning metals is converted to lower boiling materials and the catalyst is demetallized. In situations where the poisoning metal content of the feedstock includes nickel sufficient to poison the catalyst with nickel in excess of the amount which fits into the crystal lattice of the vanadium sulfur compound, the catalyst may, if desired, be increased in its vanadium content before the oxygen treatment. Vanadium poisons may be added to the feedstock, or the feedstock highly contaminated in nickel may be blended, before cracking, with a feedstock high in vanadium, such as a feed stock derived from a Venezuelan crude.

Solid oxide catalysts have long been recognized as useful in catalytically promoting conversion of hydrocarbons. For cracking processes, the catalysts which have received the widest acceptance today are usually activated or calcined predominantly silica or silica-based, e.g. silica-alumina, silica-magnesia, silica-zirconia, etc., compositions in a state of slight hydration and containing small amounts of acidic oxide promoters in many instances. The oxide catalyst may be alumina- or silica-based and ordinarily contains a substantial amount of a gel or gelatinous precipitate comprising a major portion of silica and at least one other material, such as alumina, zirconia, etc. These oxides may also contain small amounts of other inorganic materials, but current practice in catalytic cracking leans more toward the exclusion from the silica hydrate materials of foreign constituents such as alkaline metal salts which may cause sintering of the catalyst surface on regeneration and a drop in catalytic activity. For this reason, the use of wholly or partially synthetic gel catalysts, which are more uniform and less damaged by high temperatures in treatment and regeneration, is often preferable. Popular synthetic gel cracking catalysts generally contain about 10 to 30% alumina. Two such catalysts are "Aerocat" which contains about 13% $Al_2O_3$, and "High Alumina Nalcat" which contains about 25% $Al_2O_3$, with substantially the balance being silica. The catalyst may be only partially of synthetic material; for example it may be made by the precipitation of silica-alumina on clay, such as kaolinite or halloysite. One such semi-synthetic catalyst contains about equal amounts of silica-alumina gel and clay.

The manufacture of synthetic gel catalysts can be performed, for instance (1) by impregnating silica with alumina salts; (2) by direct combination of precipitated (or gelated) hydrated alumina and silica in appropriate proportions; or (3) by joint precipitation of alumina and silica from an aqueous solution of aluminum and silicon salts. Synthetic catalysts may be produced by a combination of hydrated silica with other hydrate bases as, for instance, zirconia, etc. These synthetic gel-type catalysts are activated or calcined before use.

The physical form of the catalyst varies with the type of manipulative process to which it will be exposed. In a fixed-bed process, a series of catalytic reactors may be used, some being on stream and others in the process of cleaning, regeneration, etc. In circulating catalyst systems, such as those of the fluid catalytic and "TCC" processes, catalyst moves through a reaction zone and then through a regeneration zone. In the fluid process, gases are used to convey the catalyst and to keep it in the form of a dense turbulent bed which has no definite upper interface between the dense (solid) phase and the suspended (gaseous) phase mixture of catalyst and gas. This type of processing requires the catalyst to be in the form of a fine powder, generally in a size range of about 20 to 150 microns.

In the process of this invention vanadium-sulfur compound is removed from the catalyst bed during or after attrition, sonic vibration, etc., by flotation or elutriation. To prevent excessive removal of catalyst fines with the poisoning metal compound, it is preferred to confine use of this treatment to catalysts which do not contain an appreciable portion of particles smaller than about 325 mesh. In the "TCC" or "Thermofor" process the catalyst is in the form of beads which are conveyed by elevators. Generally these beads may range in size up to about ½″ in diameter. When fresh, the minimum sized bead is generally about ⅛″. Other types of process use other forms of catalyst such as tablets or extruded pellets.

One of the most important phases of study in the improvement of catalyst performance in hydrocarbon conversion is in the area of metals poisoning. Although referred to as "metals," these catalyst contaminants may be in the form of free metals or relatively non-volatile metal compounds. It is to be understood that the term "metal" used herein refers to either form.

Various petroleum stocks have been known to contain at least traces of many metals. For example, Middle Eastern crudes contain relatively high amounts of several metal components, while Venezuelan crudes are noteworthy for their vanadium content and are relatively low in other contaminating metals such as nickel. Thus Venezuelan crudes or their fractions or blends make ideal feeds for the present process. In addition to metals naturally present, including some iron, petroleum stocks have a tendency to pick up tramp iron from transportation, storage and processing equipment. Most of these metals, when present in a stock, deposit in a relatively non-volatile form on the catalyst during the conversion processes so that regeneration of the catalyst to remove coke does not remove these contaminants.

Of the various metals which are to be found in representative hydrocarbon feedstocks some, like the alkali metals, only deactivate the catalyst without changing the product distribution; therefore, they might be considered true poisons. Others such as iron, nickel, vanadium and copper markedly alter the selectivity and activity of cracking reactions if allowed to accumulate. A poisoned catalyst generally produces a higher yield of coke and hydrogen at the expense of desired products, such as gasoline and butanes. For instance, it has been shown that the yield of butane, butylenes and gasoline, based on converting 60 volume percent of cracking feed to lighter materials and coke dropped from 58.5 to 49.6 volume percent when the amount of nickel on the catalyst increased from 55 p.p.m. to 645 p.p.m. and the amount of vanadium increased from 145 p.p.m. to 1480 p.p.m. in fluid catalytic cracking of a feedstock containing some metal contaminated stocks. Since many cracking units are limited by coke burning or gas handling facilities, increased coke or gas yields require a reduction in conversion or throughput to stay within the unit capacity.

An alternative to letting catalyst metals level increase and activity decrease is to diminish the overall metal content by raising catalyst replacement rates. Either approach, letting metals level increase, or increasing catalyst replacement rates, must be balanced against product value and operating costs to determine the most economic way of operating. The optimum metal level at which to operate any cracking unit will be a function of many factors including feedstock metal content, type and cost of catalyst, overall refinery balance, etc., and can be determined by a comprehensive study of the refinery's operations. A further alternative, demetallizing the catalyst, which avoids discarding of expensive catalyst and enables much lower grade, highly metals contaminated feedstocks to be used, is possible.

Commercially used cracking catalysts are the result of years of study and research into the nature of cracking catalysis, and the cost of these catalysts is not negligible. The cost frequently makes highly poisoned feedstocks less desirable to use in cracking operations, even though they may be in plentiful supply, because of their tendency to damage the expensive catalysts. The expense of such catalysts, however, is justified because the composition, structure, porosity and other characteristics of such catalysts are rigidly controlled so that they may give optimum results in cracking. It is important, therefore, that removing poisoning metals from the catalyst does not jeopardize the desired chemical and physical constitution of the catalyst. Although methods have been suggested in the past for removing poisoning metals from a catalyst which has been used for high temperature hydrocarbon conversions, for example, the processes of U.S. Patents 2,481,253; 2,488,718; 2,488,744; 2,668,798 and 2,693,455, the process of this invention is effective to remove vanadium and other metals without endangering the expensive catalyst.

In this invention the hydrocarbon petroleum oils utilized as feedstock for a conversion process may be of any desired type normally utilized in catalytic conversion operations. This feedstock preferably contains vanadium, sometimes as much as .05%, and the catalyst may be used as a fixed, moving or fluidized bed or may be in a more dispersed state. For typical operations, the catalytic cracking of the hydrocarbon feed would normally result in a conversion of about 50 to 60% of the feedstock into a product boiling in the gasoline boiling range. The catalytic conversion system also usually includes a regeneration procedure in which the catalyst is contacted periodically with free oxygen-containing gas in order to restore or maintain the activity of the catalyst by removing carbon. It will be understood that in this specification and claims "regeneration" refers to this carbon burn-off procedure.

Regeneration of a catalyst to remove carbon is a relatively quick procedure in most commercial catalytic conversion operations. For example, is a typical fluidized cracking unit, a portion of catalyst is continually being removed from the reactor and sent to the regenerator for contact with air at about 950 to 1200° F., more usually about 1000 to 1150° F. Combustion of coke from the catalyst is rapid, and for reasons of economy only enough air is used to supply the needed oxygen. Average residence time for a portion of catalyst in the regenerator may be on the order of about six minutes and the oxygen content of the effluent gases from the regenerator is desirably less than about ½%. The regeneration of any particular quantum of catalyst is generally regulated to give a carbon content of less than about 5.0%, generally less than about 0.5%. Prior to other demetallization treatments, subjecting the poisoned catalyst sample to magnetic flux may be found desirable to remove any tramp iron particles which may have become mixed with the catalyst.

Sulfiding can be performed by contacting the posioned catalyst with elemental sulfur vapors, or more conveniently by contacting the poisoned catalyst with a volatile sulfide, such as $H_2S$, $CS_2$ or a mercaptan. The contact with the sulfur-containing vapor can be performed at an elevated temperature generally in the range of about 500 to 1500° F., preferably about 800 to 1300° F. Other treating conditions can include a sulfur-containing vapor partial pressure of about 0.1 to 30 atmospheres or more, preferably about 0.5 to 25 atmospheres. Hydrogen sulfide is the preferred sulfiding agent. Pressures below atmospheric can be obtained either by using a partial vacuum or by diluting the vapor with gas such as nitrogen or hydrogen. The time of contact may vary on the basis of the temperature and pressure chosen and other factors such as the amount of metal to be removed. The sulfiding may run for, say, up to about 20 hours or more depending on these conditions and the severity of the poisoning. Temperatures of about 900 to 1200° F. and pressures approximating 1 atmosphere or less seen near optimum for sulfiding and this treatment often continues for at least 1 or 2 hours but the time, of course, can depend upon the manner of contacting the catalyst and sulfiding agent and the nature of the treating system, e.g. batch or continuous, as well as the rate of diffusion within the catalyst matrix.

During the sulfiding step, the vanadium oxide at the surface of the catalyst is converted gradually to the characteristic vanadium-sulfur compound, the X-ray pattern of which is given above. This compound has the tendency, apparently, to grow in large crystalline aggregates ranging in size from about 0.5 to 1.0 micron and therefore collects primarily on the exterior surface of the catalyst microsphere and not in the pores. Some of these particles appear to grow to such a size that they separate from the catalyst and may be removed by elutriation during the sulfiding step. Nickel poison, if any is present in the catalyst, is brought to the surface of the catalyst particle by the sulfiding. As nickel appears at the catalyst surface it seems to be incorporated into the vanadium sulfide lattice, either directly or by first passing through a nickel sulfide stage. Any greater quantities of nickel than will fit in the lattice, form on the surface of the catalyst as nickel sulfide, which does not seem to be removed by the mechanical pruning methods outlined below.

Metal removal during the sulfiding may be maximized by high gas velocities in the sulfiding reactor, and utilizing a reactor with as low a length-to-diameter ratio as practicable, preferably less than about 5/1. This latter condition also minimizes the deposition of sulfur on the catalyst, facilitating the removal of the remaining metal contaminants. After sulfiding, the catalyst may be briefly exposed to air for about 1–15 minutes. This condition is not necessary to the process but may be beneficial.

The metal removal experienced during sulfiding may sometimes be sufficient to give the extent of demetallization desired, but usually does not fully exploit the potentialities of this invention. Therefore, it is preferable to accomplish removal of 10 to 100% of the surface vanadium or 10 to 50% of the total vanadium by subjecting the sulfided catalyst to a separate pruning step, concurrent with or followed by disentrainment of the sulfur compound particles from the catalyst mass.

The pruning of solid agglomerated metal poisons from the catalyst in an inert environment can be accomplished, as mentioned above, by shaking or scraping the catalyst to loosen the poison agglomerates. As mentioned, sufficient agitation to cause rubbing of the particles together can remove the vanadium compound by attrition from the catalyst, but in no event should such attrition be so severe as to grind off a significant amount of the active catalyst surface. Attrition removal of the vanadium compound may also be achieved by the use of abrasive particles. A variation of the catalyst treatment proposed in U.S. Patent 2,892,771 may be performed, but milder condition of abrasion can be observed since it is neither necessary nor desirable in this invention to remove a significant amount of the catalyst surface with the vanadium compound. Shaking of the catalyst may be performed by subjecting the particles to sonic or ultrasonic vibrations in the range of say about 0.1 to 100 megacycles per second.

The vanadium compound particles can be disentrained from the catalyst mass by elutriation with an inert gas or flotation with an inert liquid. A linear flow of gas of at least about 0.05 feet/second, preferably at least about 0.10 feet/second through a fluidized bed of the catalyst during or after the vibrations is often sufficient to carry off the vanadium compound. Generally the vessel used for elutriation will be supplied with a filter for the exhaust gases of a mesh size suitable for permitting passage of the vanadium compound agglomerates while retaining catalyst fines.

The sulfided catalyst may be treated in a liquid medium for vanadium compound removal. For example, it may be put in a vessel with water for violent hydraulic scrubbing. The vessel may be provided with a propeller blade or paddle arrangement that is rotated at relatively high speed. Also, ultrasonic vibrations may be employed in the liquid medium. An aqueous wash may be conducted, for example in a 5 to 40% solids slurry, preferably about 20% solids with stirring at about 5,000 to about 20,000 r.p.m. in a vessel having a geometry such as to produce vigorous agitation. If ultrasonic vibration is used it may be in the range of about 0.1 to 100 megacycles either in conjunction with or in place of the stirring. A quiescent zone should be provided either in the same or a different vessel to allow gravitational separation by settling of the heavy catalyst particles and collection of the metal poisons at the liquid interface. The poison compound may be removed by skimming the surface or by overflow. Catalyst can be removed from the bottom of the vessel by any appropriate means. Finely dispersed gas or liquid hydrocarbon can be mixed with an aqueous slurry; as either of these materials rises to the surface of the water it tends to carry the small poison compound particles with it leaving the heavier catalyst particles. The introduction of gas into the slurry may also serve to some extent to suspend some of the vanadium compound in the liquid. Countercurrent washing or rapid filtration through a coarse filter with a porosity of about 1–20 microns, great enough to pass the suspended nickel vanadium sulfide but still retain the catalyst, may also be employed after pruning.

In this invention, before sulfiding, the essentially carbon-free, vanadium-poisoned catalyst is preferably contacted with an oxygen-containing gas for a time sufficient to stabilize a significant amount of the vanadium on the catalyst surface in its highest valence state. The oxygen treatment appears to concentrate vanadium as the pentoxide on the exterior of the silica-alumina crystal lattice structure of the catalyst, $V_2O_5$ being insoluble in solid solution in the catalyst matrix. Treatment of the regenerated catalyst with molecular oxygen-containing gas is described in copending application Serial No. 19,313, filed April 1, 1960. The temperature of this treatment is generally in the range of about 1050 to 1800° F. and preferably at least about 50° F. higher than the regeneration temperature but below a temperature where the catalyst undergoes any substantial deleterious change in its physical or chemical characteristics. The catalyst is, as pointed out, in a substantially carbon-free condition during this high-temperature treatment. If any significant amount of carbon is present in the catalyst at the start of this high-temperature treatment, the essential oxygen contact is that continued after carbon removal. In any event, after carbon removal, the oxygen treatment of the essentially carbon-free catalyst is at least long enough to stabilize a substantial amount of vanadium in its highest valence state, as evidenced by a significant increase, say at least about 10%, preferably at least about 100%, in the vanadium removal in subsequent stages of the process. This increase is over that which would have been obtained without the oxygen treatment step. The duration of the oxygen treatment and the amount of vanadium prepared by the treatment for subsequent removal is dependent upon the temperature and the characteristics of the equipment used. The length of the oxygen treatment may vary from the short time necessary to produce an observable effect in the later treatment, say, a quarter of an hour to about 6 hours or more or a time just long enough not to damage the catalyst. In a relatively static apparatus such as a muffle furnace, the effectiveness of the treatment can increase with the time over a rather extended period; in other types of apparatus, however, such as a flow reactor, where there is more thorough contact of catalyst and gas, little increase in effectiveness has been observed after about four hours of treatment.

The oxygen-containing gas used in the treatment contains molecular oxygen as the essential active ingredient and there is little significant consumption of oxygen in the treatment. The gas may be oxygen, or a mixture of oxygen with inert gas, such as air or oxygen-enriched air. The partial pressure of oxygen in the treating gas may range widely, for example, from about 0.1 to 30 atmospheres, but usually the total gas pressure will not exceed about 25 atmospheres. The factors of time, partial pressure and extent of vanadium stabilization may be chosen with a view to the most economically feasible set of conditions. It is preferred to continue the oxygen treatment for at least about 15 or 30 minutes with a gas containing at least about 1%, preferably at least about 10% oxygen. The treatment is not prolonged to a point where the catalyst will be damaged. The maximum practical time of treatment will vary from about 4 to 24 hours, depending on the type of equipment used.

As mentioned, the poisoned catalyst, before the demetallization treatment, may contain at least about 1.25 atoms of vanadium for each atom of nickel, preferably about 2–10 atoms of vanadium per total atoms of nickel and iron. If insufficient vanadium is present it may be supplied to the catalyst by any conventional means, such as by impregnation with a solution of ammonium vanadate or a vanadium chelate compound with subsequent conversion to vanadium oxide. Also, to increase the proportion of vanadium poison in a catalyst, a cracking feedstock containing nickel poison in disproportionate amounts may be blended with a feedstock high in predominantly vanadium contaminants in amounts suitable for giving a catalyst properly poisoned for the method of this invention. Also, a highly nickel-contaminated feedstock may be supplied with a vanadium compound which is soluble or dispersible in the feedstock, such as vanadium chlorides or vanadium oxytrichloride.

After pruning and removal of the vanadium-sulfur compound from catalyst, other demetallization treatments may be applied to the catalyst before it is returned to the hydrocarbon conversion reaction. Where the performance of other demetallization treatments is not found to be necessary, but some metal contaminants are left on the surface of the pruned catalyst, the nickel and vanadium compounds remaining on the surface may be rendered less harmful in subsequent use of the catalyst by destroying the sulfide on the catalyst and re-equilibrating the catalyst by putting the metals brought to the surface but not removed, back into the interior of the catalyst particle. Thus, mechanical removal may be followed by a heat treatment. Sulfide may be destroyed by high temperature treatment of the catalyst with a free oxygen-containing gas and re-equilibration of Ni and/or V may be performed by a high temperature (about 1100–1500° F.) treatment in a reducing atmosphere followed by a lower temperature (about 900–1100° F.) treatment in an oxidizing atmosphere. Where further nickel removal is desired, hydrogen peroxide treatment may be used, as described in copending application Serial No. 81,257, filed January 9, 1961, now abandoned, or a carbonylation treatment may be employed as disclosed in Serial Nos. 47,598, filed August 4, 1960, and 73,197, filed December 2, 1960, or the catalyst may be washed with a chelating agent as disclosed in Serial Nos. 763,833, filed September 29, 1958, now abandoned, and 53,623, filed September 2, 1960. Excess vanadium on the catalyst may be removed, for example, by the chlorination treatments described in applications Serial Nos. 849,119, filed October 28, 1959, now Patent No. 3,094,059; 54,532, filed September 7, 1960, now abandoned; 55,703, filed September 13, 1960, and 67,518, filed November 7, 1960.

Preferably any excess vanadium is removed by a basic aqueous wash, as disclosed in application Serial No. 39,810, filed June 30, 1960. The pH of such a wash is frequently greater than about 7.5 and the solution preferably contains ammonium ions. The solution should be substantially free, before contact with the catalyst, of any contaminant materials which would remain on the catalyst sent back to hydrocarbon conversion. The ammonium ions may be $NH_4+$ ions or organic-substituted $NH_4+$ ions such as methyl ammonium and quaternary hydrocarbon radical ammoniums. The aqueous wash solution can be prepared by addition of a dry reagent or a concentrated solution of the reagent to water, perhaps distilled or deionized water. Ammonia or methylamine gas may be dissolved directly in water. An aqueous solution of $NH_4OH$ is highly preferred, the preferred solutions having a pH of about 8 to 11.

The amount of ammonium ion in the solution is sufficient to give the desired vanadium removal and will often be in the range of about 1 to 25 or more pounds per ton of catalyst treated. Five to fifteen pounds is the preferred ammonium range but the use of more than about 10 pounds does not appear to increase vanadium removal unless it increases pH. The temperature of the wash solution does not appear to be significant in the amount of vanadium removed, but may vary within wide limits. The solution may be at room temperature or below, or may be higher. Temperatures above 215° F. require pressurized equipment, the cost of which does not appear to be justified. The temperature, of course, should not be so high and the contact should not be so long as to seriously harm the catalyst. The time of contact also may vary within wide limits, so long as thorough contact between the catalyst and the wash solution is assured. Very short contact times, for example, about 1 minute, are satisfactory, while the time of washing may last 2 to 5 hours or longer. The mechanism of the ammonium washing step may be one of simultaneous conversion of vanadium to salt form and removal by the aqueous ammonium wash but is not to be limited by such a theory.

Excess iron poison may be removed from the pruned catalyst by a simple dilute acid wash. It is sometimes advisable, therefore, when the mechanical removal of the vanadium compound takes place in a liquid medium to make the liquid medium slightly acidic. A mineral acid for example, may be added to the wash. Hydrochloric is most efficient for iron removal, but nitric is less corrosive to equipment.

In the treatment to take poisoning metals from the cracking catalyst the amount of metal is removed which is necessary to keep the average metal content of the catalyst in the cracking system below the limit of the unit's tolerance for poison. The tolerance of the cracker for poison in turn determines to a large extent the amount of metals removed in the catalyst demetallization procedure. Where the catalyst contains a greater amount of poisoning metal, a particular treatment will remove a greater amount of metal; for example, if the cracker can tolerate an average of 100 p.p.m. Ni and the demetallization process can remove 50% of the nickel content of the catalyst, only 50 p.p.m. of nickel can be removed in a pass through the catalyst demetallization system. However, where the cracker can tolerate 500 p.p.m. of nickel, it is possible to remove 250 p.p.m. nickel from the catalyst with each pass through the demetallization system. It is advisable, therefore, to operate the cracking and demetallization procedures with a catalyst having a metals content near the limit of tolerance of the cracker for poisoning metals. This tolerance for poisoning metal oxide is seldom greater than about 5,000–10,000 p.p.m. Catalyst demetallization is not economically justified unless the catalyst contains at least about 50 p.p.m. nickel and/or 50 p.p.m. vanadium. Preferably the equilibrium metals level is allowed to exceed about 200 p.p.m. nickel and/or 500 p.p.m. vanadium so that total metals removal will be greater per pass through the demetallizer.

In the treatment to take poisoning metals from the cracking catalyst a large or small amount of metal can be removed as desired. The demetallization treatment generally removes about 10 to 90% of one or more poisoning metals from a catalyst portion which passes through the treatment. Advantageously a demetallization system is used which removes about 60 to 90% nickel and 20–40% vanadium from the treated portion of catalyst. Preferably at least 50% of the equilibrium nickel content and 15% of the equilibrium vanadium content is removed. The actual time or extent of treating depends on various factors, and is controlled by the operator according to the situation he faces, e.g. the extent of metals content in the feed, the level of conversion unit tolerance for poison, the sensitivity of the particular catalyst toward a particular phase of the demetallization procedure, etc. Also, the thoroughness of treatment of any quantum of catalyst in commercial practice is balanced against the demetallization rate chosen; that is, the amount of catalyst, as compared to the total catalyst in the conversion system proper, which is subjected to the demetallization treatment per unit of time. A high rate of catalyst withdrawal from the conversion system and quick passage through a mild demetallization procedure may suffice as readily as a more intensive demetallization at a slower rate to keep the total of poisoning metal in the conversion reactor within the tolerance of the unit for poison. In a continuous operation of the commercial type a satisfactory treating rate may be about 5 to 50% of the total catalyst inventory in the system, per twenty-four hour day of operation although other treating rates may be used. With a continuously circulating catalyst stream, such as in the ordinary "fluid" system a slipstream of catalyst, at the "equilibrium" level of poisoning metals may be removed intermittently or continuously from the regenerator standpipe of the cracking system.

The catalyst is subjected to one or more of the demetallization procedures described above and then the catalyst, substantially reduced in contaminating metal content, is returned to the cracking system.

*Examples*

The following examples are illustrative of this invention but, as with the theories above given, should not be considered limiting.

A "Nalcat" synthetic-gel catalyst composed of about 25% $Al_2O_3$, substantially the rest $SiO_2$ is used in a commercial catalytic cracking conversion unit, using conventional fluidized catalyst techniques, including cracking and air regeneration to convert a feedstock (A) comprising a blend of Wyoming and Mid-Continent gas oils containing 1.0 p.p.m. Fe, 0.3 p.p.m. NiO, 1.2 p.p.m. $V_2O_5$ and about 2 weight percent sulfur. This gas oil blend had a gravity (API) of 24°, a carbon residue of about 0.3 weight percent and a boiling range of about 500–1000° F. Batches of this catalyst were removed from this commercial unit after regeneration and were subjected to various demetallization procedures according to this invention. Batch number 1 contains 327 p.p.m. NiO, 4320 p.p.m. $V_2O_5$ and 0.288% Fe. 2000 grams of this batch (sample (1a)) is charged to a reactor and exposed to a fluidizing flow of air for 1 hour at about 1300° F. Then the catalyst is sulfided with $H_2S$ for 2½ hours at 1300° F. The linear velocity of the sulfiding vapor is about 0.15 feet/second. The discharged catalyst contains 207 p.p.m. NiO, 3810 p.p.m. $V_2O_5$ and 0.274% Fe after destruction of the sulfide.

Another sample (1b) of batch 1 is treated in the same manner, except that the flow of sulfiding gas is much slower, about 0.03 feet/second. Little or no metals removal is obtained.

Batch 2 is drawn from the conversion unit after regeneration with a poisoning metals content of 313 p.p.m. NiO, 3691 p.p.m. $V_2O_5$ and 0.296% Fe. After exposure to air at 1300° F. for one hour and sulfiding with $H_2S$ for one hour at 1175° F. and high sulfiding gas velocity the catalyst contains 205 p.p.m. NiO, 3383 p.p.m. vanadium and 0.259% Fe. A sample (2a) of this catalyst is subjected to ultrasonic vibrations while exposed to a flow of inert flue gas. After this treatment the catalyst contains greatly reduced amounts of nickel, vanadium and iron.

Another sample (2b) after sulfiding, is slurried and boiled for 1 hour with water. The boiling and stirring of the slurry causes sufficient agitation to loosen and float of the nickel-vanadium-sulfur compound which is filtered from the water and gives the X-ray diffraction pattern recited above. The demetallized catalysts are reused in the cracking operation.

It is claimed:

1. A method for producing gasoline in a hydrocarbon cracking system having a catalytic cracking zone and a catalyst regeneration zone which comprises cracking at elevated temperature in said cracking zone a hydrocarbon feedstock heavier than gasoline and containing nickel and vanadium contaminants, said cracking being conducted in the presence of a synthetic gel, silica-based hydrocarbon cracking catalyst and during which cracking the catalyst becomes contaminated with nickel and vanadium of said hydrocarbon feedstock, cycling the catalyst between the cracking zone and the catalyst regeneration zone in which latter zone carbon is removed from the catalyst, bleeding a portion of the contaminated catalyst from the cracking system, sulfiding said nickel and vanadium contaminated catalyst by contacting bled catalyst at a temperature of about 500 to 1500° F. with a vaporous sulfiding agent to cause formation of crystals containing nickel, sulfur and at least about 1.25 atoms of vanadium for each atom of nickel, mechanically removing said crystals from the catalyst and returning to a cracking system catalyst reduced in nickel and vanadium contaminant.

2. The method of claim 1 in which the mechanical removal includes pruning by shaking the crystals off the catalyst.

3. The method of claim 2 in which shaking is caused by ultrasonic vibrations.

4. The method of claim 1 in which the mechanical removal includes pruning by scraping the crystals off the catalyst.

5. The method of claim 4 in which scraping is caused by attrition of catalyst particles with each other.

6. The method of claim 1 in which mechanical removal includes disentraining crystals from the catalyst mass by elutriation with an inert gas.

7. The method of claim 1 in which mechanical removal includes disentraining crystals from the catalyst mass by flotation with a liquid.

8. The method of claim 1 in which demetallization removes about 5 to 50% of the vanadium from the catalyst.

9. A method for producing gasoline in a hydrocarbon cracking system having a catalytic cracking zone and a catalyst regeneration zone which comprises cracking at elevated temperature in said cracking zone a hydrocarbon feedstock heavier than gasoline and containing nickel contaminant, said cracking being conducted in the presence of a synthetic gel, silica-based hydrocarbon cracking catalyst and during which cracking the catalyst becomes contaminated with nickel of said hydrocarbon feedstock, cycling the catalyst between the cracking zone and the catalyst regeneration zone in which latter zone carbon is removed from the catalyst, bleeding a portion of the nickel contaminated catalyst from the cracking system, adding to said catalyst any vanadium required to give the catalyst a vanadium content averaging at least about 1.25 atoms of vanadium for each atom of nickel in the catalyst, sulfiding said nickel and vanadium contaminated catalyst by contacting bled catalyst at a temperature of about 500 to 1500° F. with a vaporous sulfiding agent, to cause formation of vanadium, nickel and sulfur-containing crystals, mechanically removing said crystals from the catalyst and returning to a cracking system catalyst reduced in nickel contaminant.

10. The method of claim 9 in which the hydrocarbon stock contains vanadium in an amount sufficient to poison the catalyst with at least about 1.25 atoms of vanadium for each atom of nickel.

11. A method for producing gasoline in a hydrocarbon cracking system having a catalytic cracking zone and a catalyst regeneration zone which comprises cracking at elevated temperature in said cracking zone a hydrocarbon feedstock heavier than gasoline and containing nickel and vanadium contaminants, said cracking being conducted in the presence of a synthetic gel, silica-based hydrocarbon cracking catalyst and during which cracking the catalyst becomes contaminated with nickel and vanadium of said hydrocarbon feedstock, cycling the catalyst between the cracking zone and the catalyst regeneration zone in which latter zone carbon is oxidized at an elevated temperature and thereby removed from the catalyst, bleeding a portion of the contaminated catalyst from the cracking system, contacting bled, substantially carbon-free catalyst for at least about 15 minutes with a gas containing molecular oxygen at a temperature of at least about 1050° F., but below a tempertaure deleterious to the catalyst to increase subsequent vanadium removal from said catalyst, sulfiding said contaminated catalyst by contacting bled catalyst at a temperature of about 500 to 1500° F. with a vaporous sulfiding agent, to cause formation of crystals containing nickel, sulfur and at least about 1.25 atoms of vanadium for each atom of nickel, mechanically removing said crystals from the catalyst and returning to a cracking system catalyst reduced in nickel and vanadium contaminant.

12. The process of claim 11 in which about 5 to 60% of the vanadium is removed from the catalyst.

13. The method of claim 11 in which the sulfiding is performed by contacting with $H_2S$ at about 800 to 1300° F.

14. The method of claim 1 in which the sulfiding is performed by contacting with $H_2S$ at about 800 to 1300° F.

15. A method for producing gasoline in a hydrocarbon cracking system having a fluidized catalytic cracking zone and a fluidized catalyst regeneration zone which comprises cracking at elevated temperature in said fluidized cracking zone a hydrocarbon feedstock heavier than gasoline and containing nickel contaminant, said cracking being conducted in the presence of a synthetic gel, silica-based hydrocarbon cracking catalyst and during which cracking the catalyst becomes contaminated with nickel of said hydrocarbon feedstock, cycling the catalyst between the cracking zone and the catalyst regeneration zone in which latter zone carbon is removed from the catalyst, bleeding a portion of the nickel contaminated catalyst from the cracking system, adding to said catalyst any vanadium required to give the catalyst a vanadium content averaging at least about 1.25 atoms of vanadium for each atom of nickel of the catalyst, sulfiding said nickel contaminated catalyst by contacting bled catalyst in a fluidized bed at a temperature of about 500 to 1500° F. with a vaporous sulfiding agent, to cause formation of vanadium, nickel and sulfur-containing crystals, mechanically removing said crystals from the catalyst and returning to a cracking system catalyst reduced in nickel contaminant.

16. The method of claim 15 in which sulfiding is performed by contacting with $H_2S$ at a temperature of about 800 to 1300° F.

17. The method of claim 1 in which the catalyst is a silica-alumina catalyst.

18. The method of claim 11 in which the catalyst is silica-alumina.

References Cited in the file of this patent

UNITED STATES PATENTS

| | | |
|---|---|---|
| 2,206,337 | Steele | July 2, 1940 |
| 2,466,051 | Shabaker et al. | Apr. 5, 1952 |
| 2,598,309 | Say et al. | May 27, 1952 |
| 2,958,650 | Dart et al. | Nov. 1, 1960 |
| 3,060,117 | Payne | Oct. 23, 1962 |

OTHER REFERENCES

"Organic Chemistry," Julius Schmidt, page 35, Gurney and Jackson, London, 1950.